Oct. 8, 1929.  E. MENDENHALL  1,731,077
SKID CHAIN
Filed Oct. 10, 1927
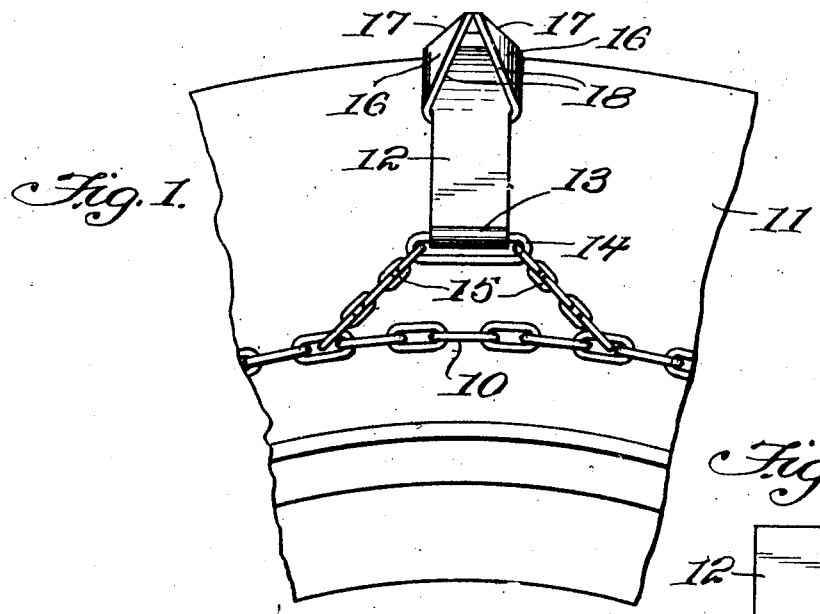
Fig. 1.
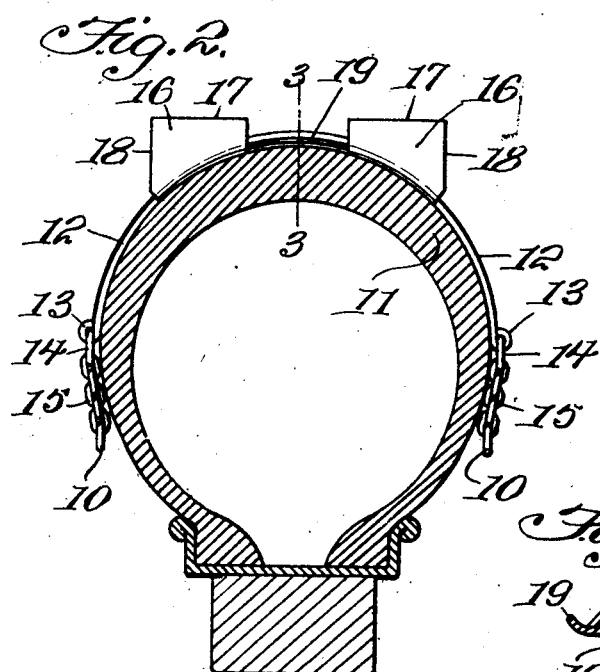
Fig. 2.
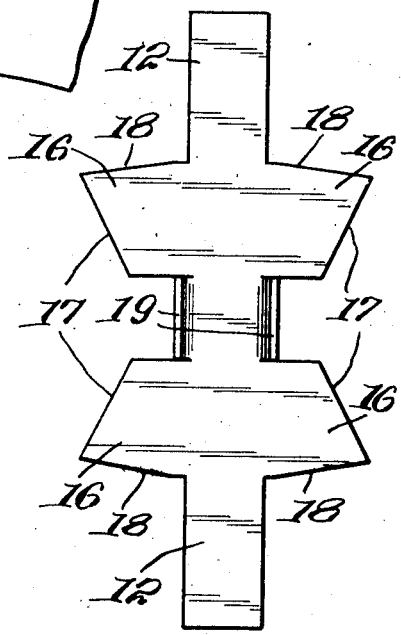
Fig. 4.
Fig. 3.
Everett Mendenhall
INVENTOR
BY Victor J. Evans
ATTORNEY Patented Oct. 8, 1929

1,731,077

UNITED STATES PATENT OFFICE

EVERETT MENDENHALL, OF SANTA ANA, CALIFORNIA

SKID CHAIN

Application filed October 10, 1927. Serial No. 225,330.

This invention relates to anti-skid devices adapted for use upon vehicle wheels.

The general object of the invention comprehends traction members adapted to provide cross members for an anti-skid chain.

Another object of the invention contemplates penetrating elements carried by the traction members.

A further object of the invention is to provide traction members with means to prevent binding action thereof or injury to tires.

With the above and other objects in view, the invention further consists of the following novel features and details of construction, to be hereinafter more fully described, illustrated in the accompanying drawings and pointed out in the appended claim.

In the drawing:

Figure 1 is a fragmentary side elevation of a vehicle wheel and tire with the invention applied.

Figure 2 is a transverse sectional view taken through the tire with the invention applied.

Figure 3 is a detail section taken on line 3—3 of Figure 2 with the tire omitted.

Figure 4 is a plan view of a blank from which one of my traction members is made.

Referring to the drawing in detail, wherein like characters of reference denote corresponding parts, the reference character 10 indicates a side chain carried upon the outer side wall of a vehicle tire 11 as shown, there being two side chains as will be apparent.

In carrying out the invention I provide elongated plate members 12 which are bent longitudinally upon themselves to follow the transvers curvature of a tire. The extremities of the plates 12 are provided with sleeve portions 13 adapted to receive and for engagement with link members 14 having connection with the side chains 10 through the instrumentality of chain links 15 extended at inclinations from the ends thereof, substantially as illustrated in Figure 1 of the drawing.

Ears 16 are provided and are laterally projected from diametrically opposite sides of the plate 12 and terminate to provide beveled ends 17. The ears are arranged in pairs and the ears of each pair engage each other when bent from the plates 12 to occupy the positions shown in Figures 1 to 3 inclusive and expose straight penetrating portions toward a road surface whereby greater traction may be afforded and excess wear eliminated. The outer side edges 18 of the ears 16 are beveled to facilitate the aforementioned position of the ears to dispose the beveled extremities 17 thereof in juxtaposition as above indicated and to provide in themselves, spaced substantially V-shaped penetrating elements.

Those portions of the plate members 12 between the pairs of ears 16 and upon the outer side edges thereof are flared as indicated at 19 to prevent binding action upon and injury to the tire 11; such construction is best illustrated in Figure 3 of the drawing.

From the foregoing description and accompanying drawing it will be noted that the invention is adapted for use as a component part of an anti-skid chain or as a replacement for broken cross chains.

The invention, due to the construction thereof, is adapted to provide penetrating portions toward a road surface to prevent digging up of the dressing therefor and excess wear upon the individual penetrating elements.

From the illustration in Figure 4 of the drawing it will be noted that the invention is stamped from a single piece of material and thus may be called and termed a punch press job, necessitating only cutting and pressing machines in the manufacture thereof. Such construction will permit the devices to be manufactured in great numbers and to be consequently sold at nominal prices within the reach of the average motorist.

The invention is susceptible of various changes in its form, proportions and minor details of construction, and the right is herein reserved to make such changes as properly fall within the scope of the appended claim.

Having thus described the invention, what is claimed is:—

An anti-skid device comprising a longitudinally curved plate terminating at its ends in sleeves to receive means to secure the device to side chains, ears arranged in pairs and formed laterally with said plate upon opposite sides of the center thereof, the ears of each pair being bent at an inclination with respect to said plate and toward each other for contacting engagement at their outer edges to provide ground penetrating means while the remaining portions of the ears of each pair are spaced from each other to provide a passage between the engaging edges and the plate, said ears having their outer and inner side edges disposed at an angle with respect to said plate, the engaging edges of one pair of ears being disposed along a straight line with the engaging edges of the other pair, and said plate having its side edges between the pairs flared outwardly.

In testimony whereof I affix my signature.

EVERETT MENDENHALL.